United States Patent [19]

Cukier

[11] 4,156,615

[45] May 29, 1979

[54] FOAMING AGENTS FOR GYPSUM BOARD MANUFACTURE

[75] Inventor: Samuel Cukier, Montreal, Canada

[73] Assignee: Domtar Inc., Montreal, Canada

[21] Appl. No.: 866,660

[22] Filed: Jan. 3, 1978

[51] Int. Cl.² ............................................. C04B 11/14
[52] U.S. Cl. ..................................... 106/111; 156/39
[58] Field of Search .......................... 106/88, 109–111; 156/39, 43

[56] References Cited

U.S. PATENT DOCUMENTS

| | | | |
|---|---|---|---|
| 3,189,511 | 6/1965 | White | 106/109 |
| 3,782,983 | 1/1974 | Komor | 106/88 |
| 3,926,650 | 12/1975 | Lange et al. | 106/111 |
| 4,057,443 | 11/1977 | Stiling et al. | 156/43 |

*Primary Examiner*—James Poer
*Attorney, Agent, or Firm*—C. A. Rowley

[57] ABSTRACT

This invention relates to a novel means of manufacture of gypsum board. The improvement herein comprises the use of sodium and/or ammonium salts of ethoxylated, sulfated alcohols as foaming agents, said alcohols being a mixture of primary, linear alcohols having an average chain length of 9 carbon atoms.

8 Claims, No Drawings

FOAMING AGENTS FOR GYPSUM BOARD MANUFACTURE

FIELD OF INVENTION

This invention relates to gypsum board manufacture and more particularly to the use of sodium and/or ammonium salts of ethoxylated, sulfated alcohols, as the active ingredient of the foaming agent used in gypsum board manufacture, said alcohols being a mixture of primary, linear alcohols having an average chain length of 9 carbon atoms.

BACKGROUND OF INVENTION/PRIOR ART

In the production of gypsum board, an aqueous core slurry composed predominantly of calcined gypsum (stucco) is spread between two sheets of paper and the resultant core is allowed to set by rehydration of the stucco and followed by driving away the excess water by heating the gypsum board in a dryer. In order to decrease the density of the gypsum core, it is common practice in the industry to incorporate air bubbles in the core. This is normally achieved by the addition of a pregenerated foam to the stucco mixer, along with other additives immediately prior to core formation. This foam is normally generated by incorporating air in an aqueous solution of foaming agent in a foam generator. Considerable quantities of water, known as gauging water are added to the stucco slurry to render the core slurry adequately fluid. The water in excess of that required to rehydrate the stucco is subsequently removed from the set gypsum board in the dryer. Minimizing the energy consumption in the dryer is a general objective in the industry, which is limited by the quantity of gauging water required to obtain an adequately fluid slurry.

It is therefore the object of this invention to provide a means of producing gypsum board, whereby savings of energy may be effected.

BRIEF DESCRIPTION OF THE INVENTION

In the process for the manufacture of foamed gypsum board, improvement in which process comprises using a foaming agent having as its principal active ingredient salts of a sulfated, ethoxylated, primary, linear alcohol blend, having the structural formula $CH_3(CH_2)_xCH_2(OCH_2CH_2)_yOSO_3^-M^+$ where x has an average value in the range of 6.5 and 7.5, with values of x lying in the range 6 to 8 constituting at least 90% of said active ingredient the average value of said y lies between 1.5 and 2.5 and $M^+$ is chosen from the group consisting of sodium and ammonium ions.

DETAILED DESCRIPTION OF THE INVENTION

It has been found that the use of a foaming agent containing as the active ingredient, a salt of an ethoxylated, sulfated, primary linear alcohol having the general formula $CH_3(CH_2)_xCH_2(OCH_2CH_2)_yOSO_3^-M^+$ renders the stucco slurry more fluid than was possible with other known foaming agents. In this context, linear refers to the substantial absence of branched chains in the alcohols contemplated for use in this foaming agent composition. In this composition, x will normally lie in the range of 6 to 8 but in some cases alcohol having x less than 6, e.g. x=4, will normally be present in small quantities. However as the proportion of the lower alcohols increases, the properties of the foaming agent tend to deteriorate, e.g. the maximum amount of the x=4 alcohol should not exceed 10% of the active ingredients. The average value of x can vary from 6.5 to 7.5 with values of x lying in the range 6 to 8 constituting at least 90% of the active ingredient; while the average value of y lies between 1.5 and 2.5, and $M^+$ represents either sodium or ammonium ions. The preferred average value of x which is approximately 7, may be obtained by employing a mixture of roughly equimolar porions of the x=6 and x=8 varieties of the alcohol. The preferred average value of y is 2.2. $M^+$ preferably represents the ammonium ion.

The active ingredient normally constitutes between 45 and 65% of the foaming agent composition; the other components in the composition being a hydrotrope and water. The hydrotrope normally comprises 10–15% of the composition and is generally one of the group comprising methanol, ethanol and isopropanol. This added alcohol accelerates dissolution of the active ingredient in water and renders the resulting composition flowable at relative low (−35° to −40° C.) temperatures. The balance (20–45%) of this composition is water, which is normally added to raise the flash-point of this composition.

It is not understood how this relative increase in fluidity of the stucco slurry is brought about merely by the addition of the foaming agent of the present invention. However the addition of the foaming agent results in a decrease in the quantity of water needed to obtain a stucco slurry that is adequately fluid for proper board formation. Reduction in water to be evaporated results in significant energy savings during drying.

Surprisingly, shorter set times are achieved by the use of this foaming agent thereby permitting the use of smaller quantities of set accelerator.

Since the foaming agent is otherwise similar to those which are currently used, no process or equipment changes are required to introduce it to an existing process for gypsum board manufacture, except those advantageous adjustments resulting from its novel properties.

This foaming agent is normally added to the foam generator in the form of an aqueous solution in which the concentration of the foaming agent is in the range 0.05 to 2% (active incredient basis). The resultant foam is then mixed with the stucco slurry in the mixer. This foam normally comprises 1 to 7% by weight of the aqueous stucco slurry.

The following examples serve to illustrate some embodiments of the present invention.

EXAMPLE I

Laboratory scale experiments were carried out to compare the relative stiffening times of stucco slurries resulting from the addition of the various foaming agents. The different foaming agents used for the comparisons, contained as active ingredient respectively: (a) the ammonium salt of the ethoxylated, sulfated, primary linear alcohols of the present invention having an average value of y=2.2 and an average value of x=7, and prepared from an alcohol blend, 98.6% of which comprised roughly equimolar amounts of the x=6 and x=8 alcohols, (to be termed hereafter $C_8$–10 foaming agent); (b) the sodium salt of ethoxylated, sulfated, primary linear alcohols having an average value of x=9 (a mixture of x=8 and x=10 alcohols), in a form normally sold under the tradename "Millifoam"; (c) a sodium salt of an alkylbenzene sulfonate of the type sold under the tradename "Ultrawet-DS".

All three stucco slurries were prepared in the same manner as follows: 1.6 parts by weight (p/W) of ground gypsum, 0.26 p/W of potassium sulfate, 0.04 p/W of lime, 0.06 p/W of paper fibre and 36.08 p/W of water was mixed at high speed in a Waring Blender Model No.PB-5A for 40 seconds. About 60.75 p/W of stucco was added to this premix in a "drill" mixer. After 10 seconds of low speed mixing, 600 ml. of foam (having a density of 0.15 g/c.c.) was added to 1656 g. of the stucco slurry and mixing continued for a further 60-seconds. The foam is generated in the following manner: 24 ml of a 2% solution of the foaming agent (active ingredient basis) was added to 130 ml of distilled water and this mixture blended in a Hamilton Beach Model No. 936 Drink Mixer for 2 minutes, at high speed. This foam was immediately added to the stucco slurry.

The resultant slurry was poured on a flat glass plate to make a patty and at 5 second intervals a knife was passed through this patty to make a cut. This cut would be closed by the lateral motion of the slurry as long as the slurry stayed in the fluid state. The time at which the cut did not close, i.e., the slurry was no longer adequately fluid, was termed the stiffening time for the slurry. Slurries containing various foaming agents, with and without the same starch were tested and the results are summarized in Table I below. The increase in fluidity when the foaming agent of this invention is used, compared with other conventionally used is striking. In plant operation, this increased fluidity makes it possible to decrease the quantity of water added to the stucco slurry, and this is turn results in energy savings during drying.

TABLE I
EFFECTS ON FOAMING AGENTS ON STIFFENING TIME OF SLURRY

| FOAMING AGENT | Without Starch Stiffening Time (seconds) | With St. Lawrence P.C.G. Starch Stiffening Time (seconds) |
|---|---|---|
| Foaming agent of the present invention | 145–155 | 140–150 |
| MILLIFOAM (TM) | 90–110 | 85–95 |
| ULTRAWET DS (TM) | 80–90 | 90–100 |

EXAMPLE 2

Plant trials using typical gypsum board core formulations were carried out to evaluate the extent of the heat savings resulting from the decrease in the fluidizing water (termed "gauging water") used when the $C_{8-10}$ foaming agent (used in Example 1) of the present invention was used. This was compared with "Ultrawet-DS" (TM) (also used in Example 1). The concentration of the active ingredient in the aqueous solution of each foaming agent was 0.2% by weight. The resultant gypsum board in both cases was substantially the same. It was found that the quantity of gauging water added to render the stucco slurry equivalently fluid decreased from "Ultrawet-DS" (TM) to the $C_{8-10}$ foaming agent, as would be expected from the preceding Example. Consequently, there was a decrease in the quantity of "free" water evaporated in the dryers, which is reflected in the lower temperatures in the drying zones when the $C_{8-10}$ foaming agent is used. There results are tabulated in Table II.

TABLE II

| Foaming Agent | | Gauging Water (lb./Mft$^2$)* | Water in aqueous soln. of foaming agent (lb./Mft$^2$)* | Water Evaporated in the Dryer (lb./Mft$^2$)* | Temperature in Dryer Zones (°F.) | | | | Calculated Latent Heat Savings (BTU/Mft$^2$)* |
|---|---|---|---|---|---|---|---|---|---|
| | | | | | I | II | III | IV | |
| I. (a) | Present invention foaming agent | 1042 | 139 | 882 | 485 | 485 | 345 | 260 | 68.6 × 10$^3$ |
| (b) | "Ultrawet DS" (TM) | 1097 | 153 | 952 | 510 | 510 | 365 | 275 | |
| II. (a) | Present Invention foaming agent | 1042 | 139 | 880 | 485 | 485 | 345 | 270 | ·92.12 × 10$^3$ |
| (b) | "Ultrawet DS" (TM) | 1083 | 161 | 974 | 510 | 510 | 365 | 270 | |

*Mft$^2$ = 1000 ft$^2$

EXAMPLE 3

Plant trials were carried out to evaluate the effect of change in foaming agent on the quantity of potassium sulfate in the accelerator system, used to control thermal set time. Thermal set time is the time required for the setting gypsum to reach the highest temperature during rehydration. "Millifoam" (TM) and the $C_{8-10}$ foaming agent of the present invention, similar to that used in the first example were first employed at an equal foaming agent concentration and in equivalent amounts in the slurry and it was found when the foaming agent of the present invention was used the potassium sulfate component of the accelerator system could be decreased by 1 lb./Mft$^2$ of ½" gypsum board produced, while maintaining a thermal set time less than that attainable with equivalent amounts of "Millifoam" (TM) and larger amounts of potassium sulfate. In order to obtain the same thermal set time as found with Millifoam (TM) it is necessary to reduce the foaming agent concentration of the $C_{8-10}$ foaming agent by 20% while maintaining the reduced quantity of accelerator. All these trials were carried out using the same amount of gauging water.

The results of these experiments are summarized in Table III.

TABLE III

| Foaming Agent | Foaming Agent Concentration** (%) | Foam Usage (lb./Mft$^2$* of board) | Accelerator (Potassium Sulfate) Used (lb./Mft$^2$* board) | Thermal Set Time (min:sec) |
|---|---|---|---|---|
| (1) Millifoam (TM) | 1.0 | 1.35 | 2.8 | 8:00–8.15 |
| (2) C$_{8-10}$ foaming agent of present invention | 1.0 | 1.35 | 1.8 | 7:45 |
| (3) Do | 0.8 | 1.18 | 1.8 | 8:00–8:15 |

**Active Ingredient Content in foaming Agent of Run
(1) "Millifoam" (TM) = minimum 55%
(2)/(3) C$_{8-10}$ foaming agent of the present invention = 58 ± 1.0%
* Mft$^2$ = 1000 ft$^2$

EXAMPLE 4

Foaming agents containing sodium and ammonium salts of the ethoxylated, sulfated, primary linear alcohols were compared in laboratory tests. In each case roughly equimolar mixture of the x=6 and x=8 alcohol species was used to give an average value of x=7, while y had an average value of 2.2. Core slurries were made as described in Example 1.

Identical laboratory scale hand samples of gypsum board were made using these slurries. The set board was placed to dry in an oven in which the temperature was programmed to decrease from about 490° F. to 200° F. over a period of 52 minutes to simulate plant drying conditions.

The two board samples showed identical (within limits of experimental error) dryout and stiffening times, suggesting the behaviour of the two foaming agents was similar for the two cations. The results are shown in Table IV.

TABLE IV

|  | Sodium Salt | Ammonium Salt |
|---|---|---|
| Gauging water (ml) | 575 | 575 |
| Water added to foaming agent solution (ml) | 130 | 130 |
| Foaming agent concentration (%) (active ingredient basis) | 2 | 2 |
| Foam usage (ml) | 600 | 600 |
| Accelerator system | same | same |
| Stiffening time (seconds) | ~140 | 145–155 |
| Wet weight (g) | 2819 | 2838 |
| Dry weight (g) | 1790 | 1810 |
| Dry out (g) | 1029 | 1028 |

I claim:

1. In the process for the manufacture of foamed gypsum board which comprises the steps of making an aqueous slurry of stucco, preforming a foam, mixing said preformed foam with said slurry, spreading said slurry and enclosing same between two paper sheets thereby to form a board, hydrating of at least a significant portion of said stucco, heating said board to remove water in excess of that required for the hydration of stucco, the improvement comprises accelerating said hydration and reducing said heating by foaming said preformed foam by entrainment of air into a solution of a foaming agent having as its principal ingredient salts of a sulfated, ethoxylated primary linear alcohol blend having the structural formula $CH_3(CH_2)_xCH_2(OCH_2CH_2)_yOSO_3^-M^+$ where x has an average value in the range 6.5 and 7.5, with values of x lying in the range 6 to 8 constituting at least 90% of said active ingredient, the average value of y lines between 1.5 and 2.5 and M$^+$ is chosen from the group consisting of sodium and ammonium ions.

2. A process as described in claim 1, where said average value of said x is 7.

3. A process as described in claim 1 wherein said active ingredient substantially comprises a mixture of active ingredient having values of x=6 and x=8.

4. A process as described in claim 1 where said average value of said y is 2.2.

5. A process as described in claim 1 where said M$^+$ represents sodium ions.

6. A process as described in claim 1 where said M$^+$ represents ammonium ions.

7. A process as described in claim 1 where said active ingredient is dissolved in a water-alcohol mixture said alcohol in said mixture chosen from the group consisting of methanol, ethanol and isopropanol.

8. A process as described in claim 1 where said active ingredient comprises 45 to 65% by weight of said foaming agent.

* * * * *